United States Patent [19]
Weichel

[11] Patent Number: 4,560,010
[45] Date of Patent: Dec. 24, 1985

[54] SOIL LAYER CULTIVATOR WITH A PRESSURE ROLLER UNIT

[76] Inventor: Ernst Weichel, Bahnhofstrasse 1, D-7326 Heiningen, Fed. Rep. of Germany

[21] Appl. No.: 400,076

[22] Filed: Jul. 20, 1982

[30] Foreign Application Priority Data

Jul. 21, 1981 [DE] Fed. Rep. of Germany ....... 3128709

[51] Int. Cl.[4] ............................................. A01B 49/02
[52] U.S. Cl. ...................................... 172/177; 172/52; 172/69; 172/70; 172/71; 172/196; 172/640; 172/650
[58] Field of Search ......................... 172/65, 68, 71, 98, 172/177, 182, 183, 47, 63, 150, 151, 153, 174, 179, 180, 196, 451, 156, 157, 52, 69, 70, 640, 650

[56] References Cited

U.S. PATENT DOCUMENTS

| | | | |
|---|---|---|---|
| 3,698,485 | 10/1972 | Trimpe et al. | 172/65 |
| 4,095,653 | 6/1978 | Van der Lely | 172/451 X |
| 4,258,635 | 3/1981 | Lutz et al. | 172/68 X |
| 4,337,834 | 7/1982 | Weichel | 172/47 X |

FOREIGN PATENT DOCUMENTS

| | | | |
|---|---|---|---|
| 2652739 | 5/1978 | Fed. Rep. of Germany | 172/47 |
| 2819990 | 11/1979 | Fed. Rep. of Germany | 172/65 |
| 521276 | 3/1955 | Italy | 172/98 |
| 670259 | 7/1979 | U.S.S.R. | 172/65 |

*Primary Examiner*—Richard T. Stouffer
*Attorney, Agent, or Firm*—Toren, McGeady, Stanger, Goldberg & Kiel

[57] ABSTRACT

To prevent the development of clods on the soil surface when using a soil layer cultivator for the deep loosening of a field or the like, a pressure roller is provided to travel over the soil surface rearwardly of the elements effecting the deep loosening of the soil. The pressure roller is made up of several sections mounted on a common shaft with the individual roller sections located between support posts on a frame tube which posts support the loosening elements. The roller sections may be hinged individually or in groups to the frame tube. The rollers may roll freely over the soil surface or a forced drive for the roller sections can be provided.

7 Claims, 11 Drawing Figures

SOIL LAYER CULTIVATOR WITH A PRESSURE ROLLER UNIT

The invention relates to a soil layer cultivator according to the preamble of the main claim.

Such devices have proven to be useful for several years in agriculture for deep loosening of compact, arable soil and require in their structural basic principle no longer any general change or improvement.

However, since during specific work steps, for instance undercutting of meadows and similar green surfaces, in addition to loosening of the lower soil layers due to the arrow shape and the angle of pitch of the wing-shaped loosening shares, also in the surface area a sort of clod formation or broken soil may occur which for instance would make subsequent mowing difficult or impossible, it is the task of the present invention to provide measures in devices of the type described above with which this undesirable side effect can be prevented or can again be compensated for.

Additional tasks to be solved with the present invention are to reduce the requirement of traction of the entire device combination, to prevent the occurrence of blockage at the support posts of the loosening tools, for instance due to large amounts particularly of long stalk grain or corn straw or the like, and to make it possible to adhere to very limited working depths of subsequent devices for seedbed preparation, also on soil which has been relatively deeply loosened in the same work step.

This task is solved with the present invention essentially by means of a pressure roller which is hinged to the frame of the device, extends over the entire operating widths of the loosening shares, is freely rotatable or forcibly rotatable and extends with at least a part of its periphery in the vertical projection above the loosening share.

Since this pressure roller is comprised of individual partial sections which are connected with one another by means of a common shaft, are uniformly spaced apart in the axial direction, and the partial sections project from the rear of the device into the respective spaces between the support posts and/or the lower three-point brackets, and in addition a sort of horizontal and vertical possibility of adjustment of the roller is provided, it is apparent that with these means and measures a roller adjustment relative to the loosening elements can be made in which a possible breaking-up of the soil to be prepared can be limited by means of the individual roller sections before a clod-like turnover or the like of the upper soil layer occurs.

Additional details which are advantageous for the construction and function can be seen in the remaining subclaims as well as in the drawing and in the drawing description. In the drawing:

Figure 1:
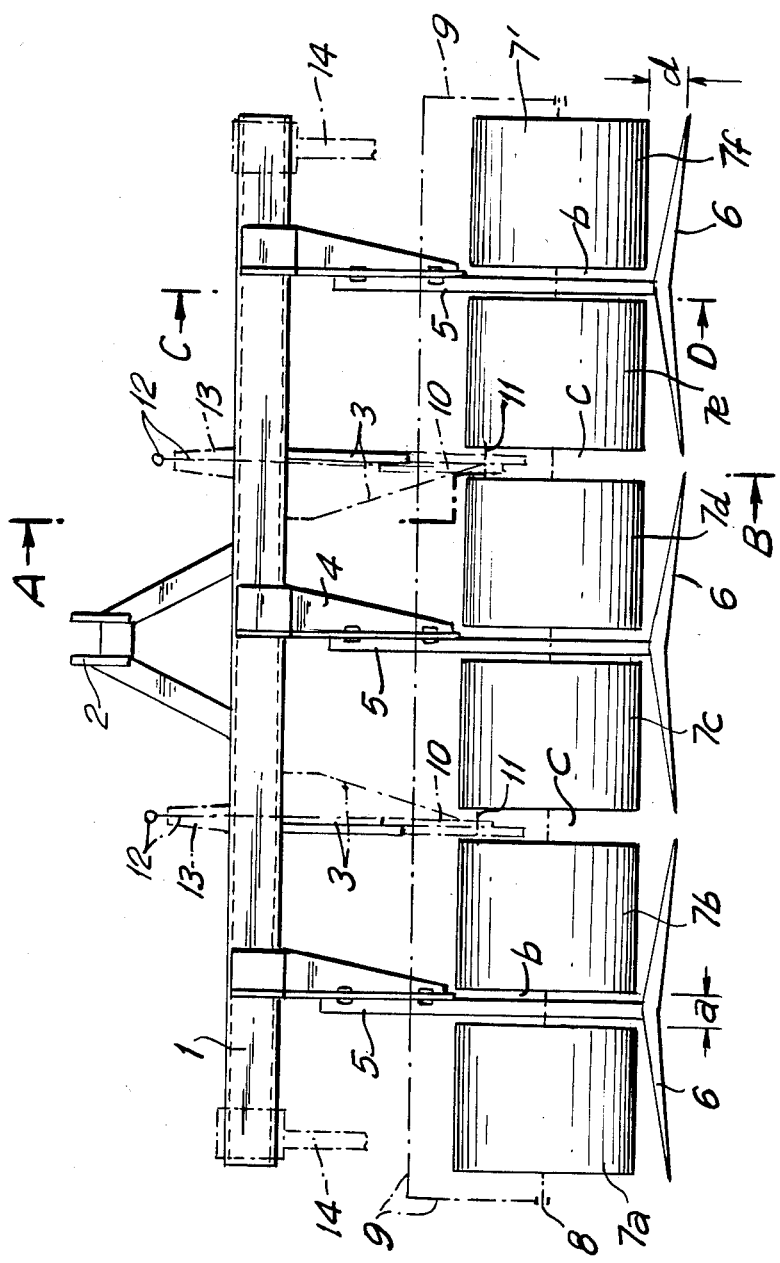
FIG. 1 shows a rear view of an implement according to the invention, shown schematically to the greatest extent.
Figure 2:
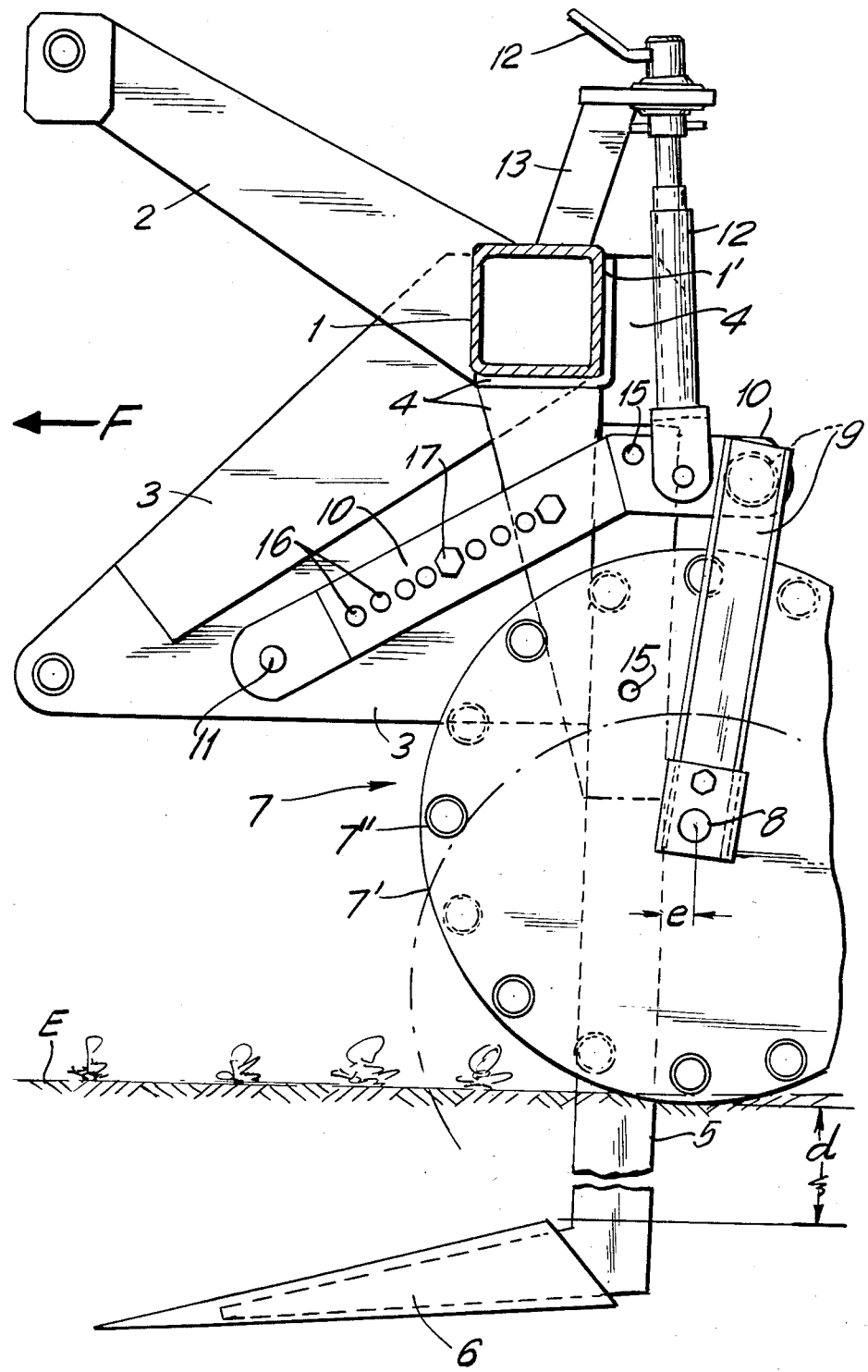
FIG. 2 shows a side view of FIG. 1 on enlarged scale and according to line AB.

The soil layer cultivator, shown in FIGS. 1 and 2, consists in its known basic construction of a frame tube 1 which is located transversely to the working direction, with a three-point connector 2, 3 in front and supports 4 for the posts 5 of the loosening shares 6 which are firmly connected to the frame 1.

Above these loosening shares 6, a pressure roller 7 is arranged with an outer jacket 7' which has a closed surface (FIG. 1) or may be constructed as a cage with rods 7" (FIG. 2). In order to be able to bring this roller 7, 7' or 7, 7" into a favorable position above the loosening shares 6, the roller consists of several partial sections 7a to 7f which are connected with one another by means of a common shaft 8 and are spaced apart a mutual horizontal distance a in relation to one another and project from the rear of the frame 1' into the respective spaces (b or c) between the support posts 5 and/or the spaces between the support posts and the lower three-point brackets 3. At these brackets 3, also the stirrup-shaped yoke 9 which carries the roller 7 is hinged movably by means of lever arms 10 in points of rotation 11 in such a way that the roller can be changed in its vertical spacing d with respect to the loosening shares 6 by means of spindles 12 which are attached to the frame supports 13 and thus can be adapted to the respective requirements. At the respective ends of the frame tube 1, also supports 14 for conventional jack wheels or follower wheels which are not shown here are shown with a dash-dot line.

Figure 3:
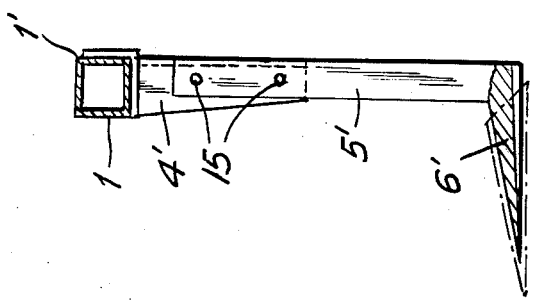
FIG. 3 shows the attachment of the support posts in detail and according to line CD in FIG. 1.

In the sectional representation according to FIG. 3, it is finally also indicated that the supports 4' for the posts 5' of the loosening shares 6' can be installed at the frame 1 in such a way that, in addition to the already known connection of the posts 5' in front of or behind the frame tube 1, also a connection directly below the frame tube is possible. Due to an appropriate arrangement of bores 15, the posts 5, 5' can also be vertically adjustable, i.e. can be screwed on in different vertical positions, just as a longitudinal adjustment of the roller 7 in the driving direction F is possible by means of the screws and bores 16, 17 in the lever arms 10.

Figure 4:
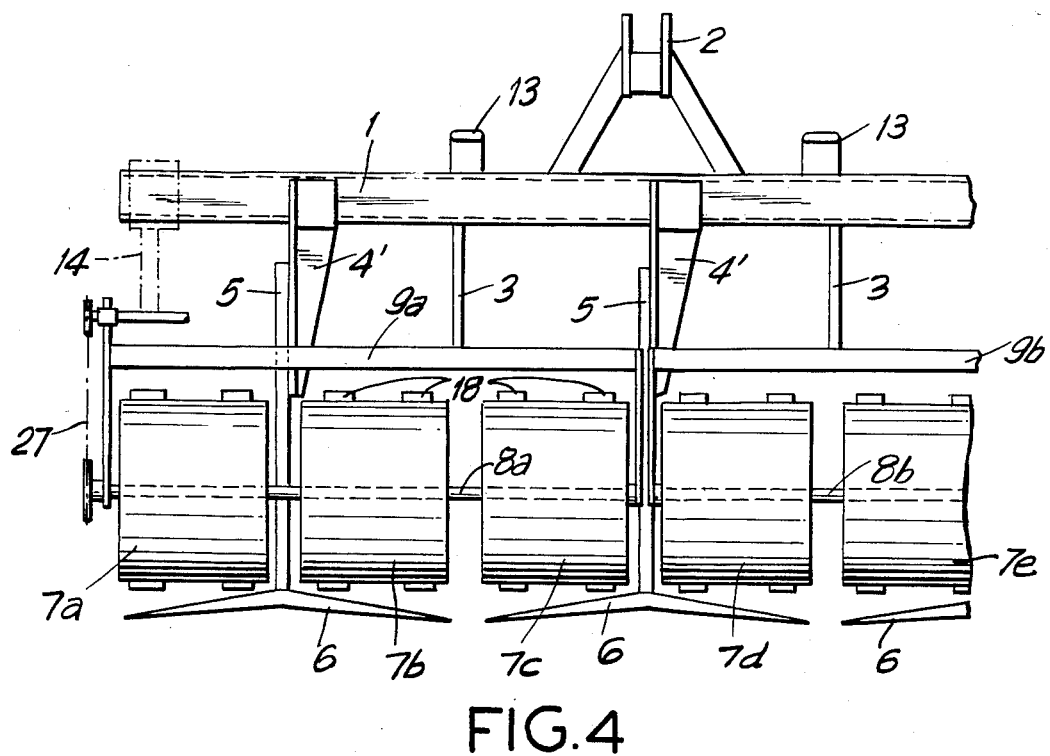
FIG. 4 is a partial view, similar to FIG. 1 of another embodiment of the present invention.

According to the illustration in FIG. 4, as an alternate it can be provided that several roller sections 7a to 7c and 7d to 7f are combined in groups. These groups are then also hinged to the frame so as to be separately adjustable in a manner equivalent to FIGS. 1 and 2 by means of stirrup sections 9a or 9b which engage at the shaft sections 8a or 8b. This embodiment may also be of advantage in the preparation of different field strips, just as the embodiment of the profiled roller surface with web-like engaging elements 18.

Figure 5:
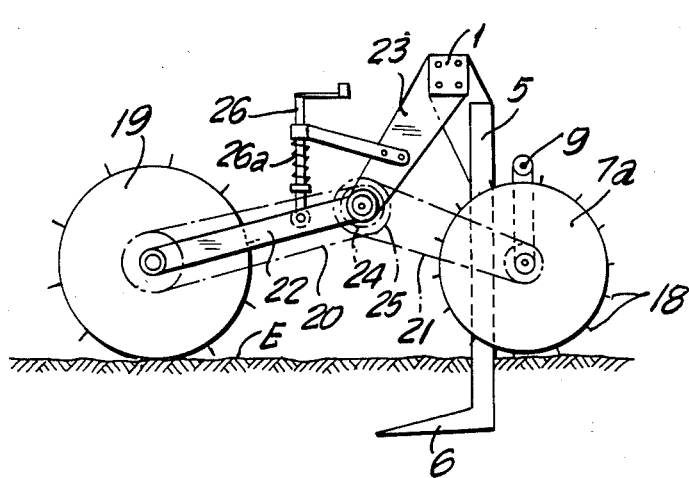
FIGS. 5 to 11 are schematic side views of further embodiments of the present invention.

In another embodiment of the present invention, it is also conceivable to arrange the pressure roller sections 7a to 7f rigidly on the shaft 8 or the shaft sections 8a and 8b and to drive these sections forcibly by means of the driving elements 20, 21 according to FIG. 5 by means of a ground wheel drive which is known per se and which runs for instance at the side of the tractor. The ground wheel drive 19 here is advantageously supported by means of a rocker arm 22 at an arm 23 which originates from the frame 1, wherein this arm also carries the intermediate wheels 24, 25 for the drive chains 20, 21. The contact pressure of the wheel 19 can be set by means of an adjusting spindle 26 and a compression spring 26a.

Figure 6:
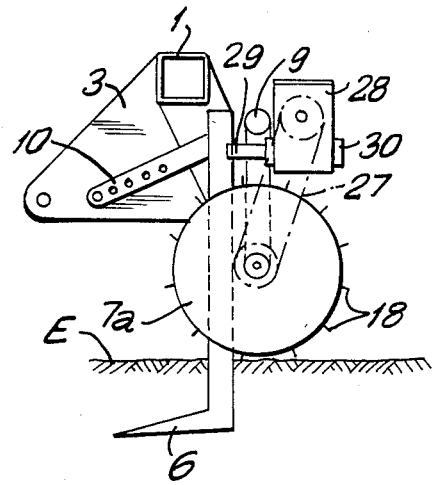

Alternatively thereto, FIG. 6 finally shows a solution in which the forced drive 27 takes place by means of a gearing 28 which has a connecting journal 29 for a tractor power take-off which is not shown. This forced drive is particularly advantageous on heavy or dry soil, or on soil which is covered with long stalked straw, because it makes possible a considerable gain in traction and an absolutely blockage-free operation. An additional connecting journal 30 and a possibly hooked-on follower device can also be provided at the gearing 28.

Figure 7:
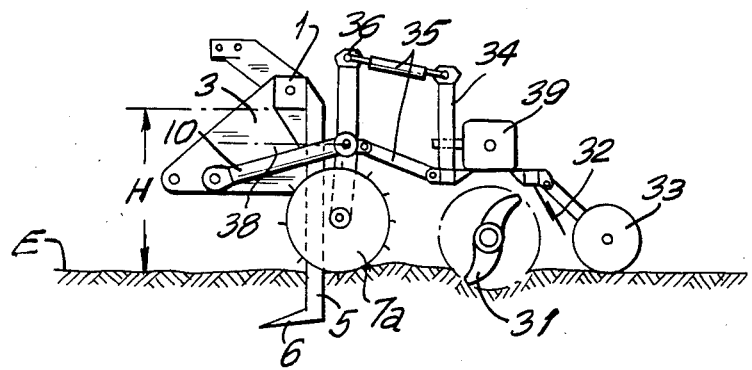
Figure 8:
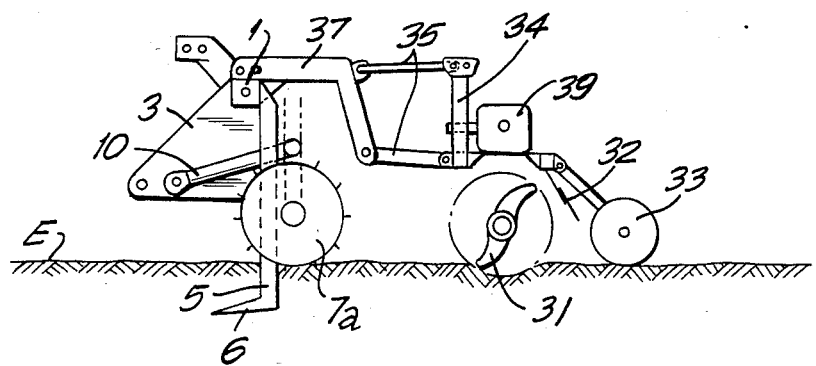
Figure 9:
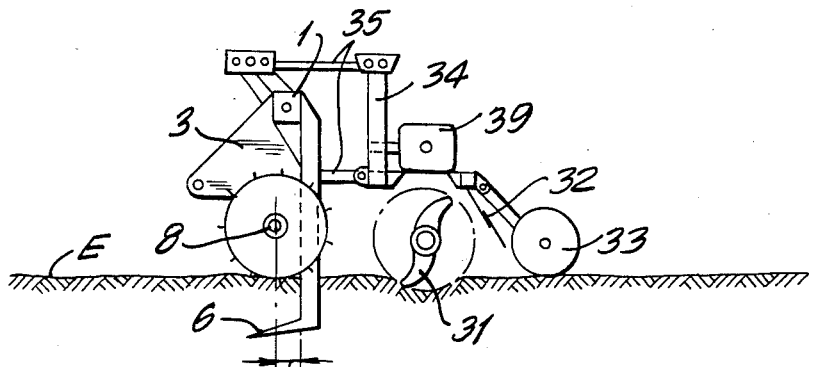

FIGS. 7 to 9 show the possibility to hook on such a follower device, wherein here a rotor harrow 31 is shown with a scraper blade 32 and a tiller roller 33, arranged thereafter. The mounting frame 34 of the rotor harrow 31 is here hinged so as to be adjustable at the structure 36 of the roller 7a to 7b, either by means of arms 35 or the like or by means of a separate, intermediate bridge 37 directly at the transverse support 1 of the basic implement 1 to 6 (FIG. 8), or in another known manner which is not further described.

In FIG. 9 it is finally indicated that the pressure roller 7a to 7f also may be arranged in front of the posts 5 of the loosening shares 6 by a specific distance e', instead of behind the latter, if certain soil conditions should require this. This special vertical position H of the main frame 1 makes an unimpeded passage of the tractor power take-off 38 to the main gearing 39 of the rotor harrow 31 possible.

Figure 10:
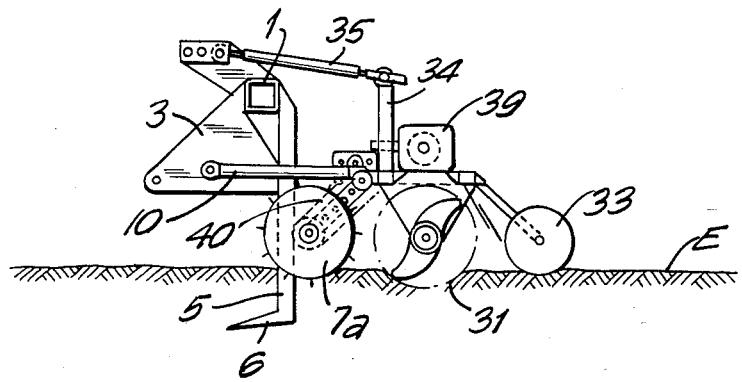

In FIG. 10 it is shown under the same concept of the invention that the special roller which saves traction in the forced drive can also be provided with a drive 40 which is taken directly from the main gearing 39 of the rotor harrow 31.

Figure 11:
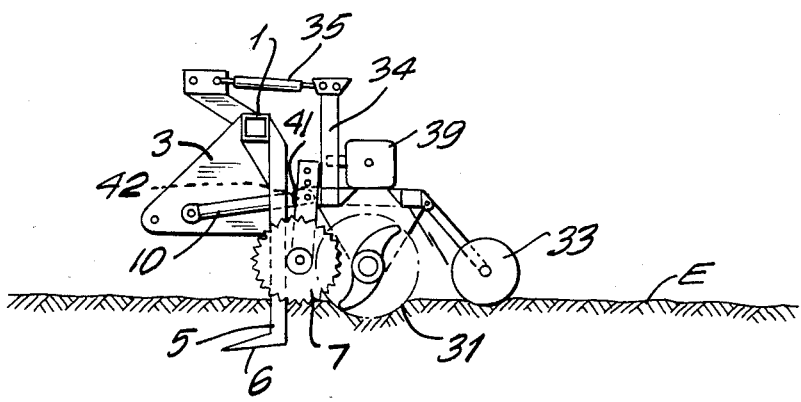

In addition, a considerably shorter structural length of the entire machine unit is accomplished, compared to the embodiments in FIGS. 7 to 9, if according to FIGS. 10 and 11 the frame 34 of the rotor harrow is connected directly to the yoke 9 of the pressure roller 7.

A rigid support for the pressure roller 7 which can only be adjusted vertically has also the advantage that this roller 7 can in addition take over a supporting function and thus an exact depth control for the rotor harrow 31, even on soil which has been considerably and at times unevenly lifted by the deeply penetrating loosening shares of the soil layer cultivator. This enables for the first time the very flat crumbling of the uppermost soil layer or the fragmentation of plants growing thereon, regardless of the depths to which the loosening shares 6 are set, and consequently prevents any impairment of the soil life and prevents water losses.

A very short structural length is also achieved if, according to FIG. 11, the pressure roller 7 is formed of disks which are arranged next to one another, spaced apart, and the rotor harrow is connected so closely that its teeth engage between the roller disks. This also improves the fragmentation and mixing of harvest residues.

Finally, a special design of the pressure roller 7 which is not shown in the drawing prevents that long-stalked grain or corn straw which lies on the soil surface from accumulating in front of the support posts of the loosening shares. This is achieved by arranging the roller section only in every second space between two adjoining support posts.

In this way, it is prevented that one and the same straw bunch or the like is pressed to the soil by always one roller section which is arranged on the side of a support post and therefore may cause blockage of the rollers. Each roller section which is arranged between two support posts of the loosening tools presses moreover onto the ground also the straw or the like which is picked up and which in part lies before the adjacent space, so that it can be pulled in free of blockage or can be fed rearwardly.

If roller sections which consist of disks are used the teeth of the rotor harrow can engage through the spaces between these disks and achieve a particularly good fragmentation and mixing of the harvest residues. It may be advantageous to use disks with toothed rims which can hold the straw better.

I claim:

1. A soil cultivator for movement in a working direction for a deep loosening of compact, arable soil, green surfaces or the like, comprising a frame tube which extends transversely of the working direction and has a front side facing in the working direction and an opposite rear side, a three-point connection attached to said frame tube and having an upper part and lower parts, support posts depending downwardly from said frame tube and having a front side facing in the working direction and an oppositely facing rear side, wing-shaped loosening elements secured to the lower ends of said support posts on the front sides thereof with the working width of said loosening elements extending in the direction of said frame tube laterally outwardly from both sides of said support posts so that the outer ends of said loosening elements are closely spaced apart, said support posts are vertically adjustable for selectively positioning said loosening elements at a desired depth below the ground surface, wherein the improvement comprises a pressure roller (7) is hinged to said frame tube (1) and extends over the entire working width of said loosening elements (6), said pressure roller is freely rotatable and extends at least with part of circumferential periphery thereof in vertical projection above said loosening elements (6), said pressure roller (7) comprises a plurality of individual partial roller sections (7a to 7f), at least one common shaft connecting said roller sections together and spacing adjacent said partial roller sections apart at a mutual axial spacing (a) therebetween greater than the dimension of said support posts extending transversely of the working direction, and said partial sections project from the rear side of said frame tube (1') into the respective spaces (b and c) between adjacent said support posts (5), a stirrup-shaped yoke (9) supports said at least one common shaft (8) of said pressure roller (7), and said yoke is hinged to be pivoted at said lower parts (3) of said three-point connection by elongated levers (10) which can be adjusted in the elongated direction thereof, and adjusting spindles connected to said pressure roller for vertically adjusting said roller.

2. A soil layer cultivator according to claim 1, characterized in that said pressure roller (7) is supported so as to be horizontally adjustable in its effective distance (e) on the rear side of said frame tube relative to said support posts (5) to said loosening elements.

3. A soil layer cultivator according to claim 1, characterized in that said partial roller sections each have an outer jacket with a closed, smooth circumferential peripheral surface (7).

4. A soil layer cultivator according to claim 1, characterized in that supports for said support posts (5) of said loosening elements (6) are firmly connected to said frame tube (1) and extend downwardly as vertical brackets in the direction towards the soil (E) in the area of the spaces (a) between adjacent said individual partial roller sections (7a to 7f).

5. A soil layer cultivator according to claim 4, characterized in that said support posts (5') of said loosening elements (6') are located, in the vertical projection, directly below said frame (1).

7. A soil layer cultivator according to claim 1, characterized in that said yoke comprises a plurality of yoke parts each supporting a number of said partial roller sections (7a to 7f) in groups (7a to 7c and 7d to 7f) and said shaft comprising a shaft section (8a and 8b) for each group of said partial roller sections so as to be adjustable at said frame tube (1).

7. A soil layer cultivator according to claim 1, characterized in that said partial roller sections each have a profiled, cage-like open circumferentially extending surface (7") formed of a plurality of circumferentially spaced individual horizontal rods.

* * * * *